3,053,807
PREPARATION OF RESINS
Burton E. Lederman, Conshohocken, and Nicholas J. Capron, Chalfont, Pa., assignors to Pennsalt Chemicals Corporation, Philadelphia, Pa., a corporation of Pennsylvania
No Drawing. Filed June 26, 1959, Ser. No. 822,995
13 Claims. (Cl. 260—57)

This invention relates to a method for preparing heat-reactive, oil-soluble phenol-formaldehyde resins.

Oil-soluble heat reacting alkylated phenol-formaldehyde resins are widely used in the preparation of varnishes and the like. They are commonly incorporated, for example, with drying oils such as tung, linseed, and dehydrated castor oils, to provide varnishes of improved hardness and chemical resistance.

Such oil-soluble resins are usually prepared by condensing an alkylated phenol such as para-tertiary-butyl, or para-tertiary-amyl phenol with formaldehyde in the presence of an inorganic, alkaline catalyst such as sodium hydroxide or sodium carbonate. This requires the later steps of acidification of the reaction mixture to neutralize it, followed by washing with water and separation of the resin layer from the aqueous wash layer. The neutralization and water washing steps add considerably to the expense and time required in the preparation of the resin. Moreover, yields are reduced through loss of resin in separation. When preparing phenolic resins from the more reactive phenols, such as unsubstituted phenol or metacresol, these neutralization and washing steps have been avoided by using ammonia or an organic amine as the condensation catalyst, the ammonia or amine catalyst being simply stripped off at the end of the condensation reaction by a simple distillation step. The use of amine catalysts for the preparation of heat reactive resins from the more sluggishly reacting higher alkylated phenols, such as meta-tertiary-butyl or meta-tertiary-amyl phenol, has not generally been considered practical since the catalytic effect of the amine has been found not strong enough to promote the condensation of formaldehyde with the phenol in a sufficiently high ratio within practicable reaction times.

In accordance with the present invention a feasible method has now been found for preparing oil-soluble, heat-reactive resins from alkylated phenols in which the alkyl group contains 4 carbon atoms or more which permits the use of a tertiary amine condensation catalyst which can be stripped off by a simple distillation step at the end of the condensation reaction, thus avoiding the expense and additional time required for the usual neutralization and washing steps required when inorganic alkalis catalysts such as sodium hydroxide are employed. It has been found that this may be accomplished by a procedure which involves (1) the use of an initially, substantially anhydrous reaction mixture, this requiring the use of a substantially anhydrous form of formaldehyde such as paraformaldehyde or an alcoholic solution of formaldehyde or paraformaldehyde; (2) the use of an alcohol solvent which maintains the reactants, i.e. alkylphenol and formaldehyde, together with the water of reaction formed as the condensation proceeds, in a substantially one phase homogeneous solution under the prevailing reaction conditions, and which has a boiling point such that the mixture refluxes at the desired reaction temperature, viz. from about 80° to 120° C., and (3) the addition of a minor amount of a reactive phenol, preferably unsubstituted phenol, during the course of the reaction, the reactive phenol being employed in amounts insufficient to substantially reduce the oil solubility of the resin obtained. After carrying out the condensation reaction in accordance with the above procedure the reaction mixture is distilled to strip off the alcohol solvent, the amine catalyst, and water of condensation to a maximum still-pot temperature of about 160° C.

Suitable alkylated phenols include those of the formula:

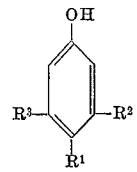

where $R^1$ is an alkyl group having from 4 to 9 carbon atoms and $R^2$ and $R^3$ are selected from the class consisting of hydrogen and methyl radicals and may be the same or different. The preferred alkylated phenols are those in which $R^1$ is a $C_4$ to $C_5$ alkyl group and $R^2$ and $R^3$ are hydrogen, particularly para-tertiary-butyl phenol and para-tertiary-amyl phenol, the latter being most highly preferred.

A substantially anhydrous form of formaldehyde should be employed. This excludes the use, for example, of formalin, i.e. aqueous solutions of formaldehyde usually containing from 37 to 40% formaldehyde. It has been found that the presence of any substantial amounts of water in the initial reaction mixture, viz. more than approximately 10% by weight, slows down the condensation of the alkylphenol with formaldehyde to such an extent that it becomes impracticable to obtain sufficient formaldehyde reaction to produce a heat reactive resin. Preferably, formaldehyde is used in the form of paraformaldehyde or a substantial anhydrous alcoholic solution of formaldehyde such as a paraformaldehyde solution in isopropanol or in n-propanol.

The reactive phenol which is added during the course of the reaction is preferably unsubstituted phenol, but may also be a substituted phenol having a reactivity with formaldehyde of the same order as unsubstituted phenol, such as metacresol, 3,5-xylenol or a polyhydric phenol such as diphenol or catechol. Such reactive phenol is employed in minor amounts relative to the alkylated phenol. The molar ratio of the more reactive phenol to alkylated phenol should be within the range of from 0.1:1 to 0.6:1 and preferably from 0.3:1 to 0.5:1.

The over-all molar ratio of total phenol (i.e. alkylated phenol plus more reactive phenol) to formaldehyde should be such that there is a slight molar excess of formaldehyde. Generally, total formaldehyde:phenol ratios of from 1.1:1 to 2:1 and preferably from 1.3:1 to 1.8:1 should be used.

As pointed out, the alcohol solvent must be one which maintains the paraformaldehyde, the phenols, and the amine catalyst, together with the water liberated by the condensation reaction, in a substantially one phase, homogeneous solution during the reaction. It has been found that this is critically necessary for the proper formaldehyde consumption (which in turn is necessary in order to obtain a heat reactive resin). It has been found that even a slight non-homogeneity in the reaction mass tends to favor resinification (consuming methylol groups) rather than the desired introduction of additional methylol groups. Thus, after the appearance of even slight cloudiness in the recation mass in the earlier or intermediate stages of the reaction very little additional formaldehyde consumption takes place, resinification being the favored reaction under these conditions.

In addition to maintaining a homogeneous reaction mass up to the end of the reaction period, the alcohol solvent employed should also have a boiling range such that the reaction mixture will reflux at atmospheric pressure at the desired reaction temperature, viz. a temperature between 80° C. and 120° C. Finally, the alcohol solvent must be sufficiently volatile that the bulk of it may be stripped off at atmospheric pressure at a still-pot temperature below 140° C. and preferably below 120° C.

Preferred alcohols satisfying these requirements are aliphatic alcohols containing from 3 to 5 carbon atoms and having atmospheric boiling points ranging from about 80° C. to 120° C. Included in this preferred class are isopropanol, n-propanol, n-butyl alcohol, secondary butyl alcohol, tertiary-butyl-alcohol, and tertiary-amyl-alcohol. N-propanol, tert-butyl-alcohol and tert-amyl-alcohol are particularly preferred solvents.

The amount of alcohol employed should be at least sufficient to maintain the reaction mixture in a one phase homogeneous solution until near the end of the reaction period, this being essential, as pointed out above, to prevent premature resinification of the mixture with resultant low formaldehyde consumption. The use of solvent in excess of that required to maintain a homogeneous reaction mixture is undesirable because of the additional cost and because, in general, the higher the dilution the slower the reaction rate. The weight percent of solvent based on total phenol should generally be in the range of from 30% to 60% and preferably in the range of from 35% to 50%.

Suitable tertiary-amine catalysts are, in general, aliphatic tertiary amines boiling between 80° C. and 200° C. and preferably 85° C. to 140° C. at atmospheric pressure. The volatility of the amine must be such that it is not distilled out of the reaction mixture at the desired reaction temperatures, namely from 80° to 120° C. at atmospheric pressure. It must be sufficiently volatile, however, that it can be distilled from the reaction mixture at a maximum temperature of 160° C. by vacuum distillation at a reasonable pressure of not less than about 100 mm. Hg in less than 3 hours. Tertiary-amine catalysts satisfying these requirements include particularly triethylamine, dimethylaminoethanol,

[(CH₃)₂N—CH₂CH₂OH] diethylaminoethanol

[(C₂H₅)₂N—CH₂CH₂OH] methylethylaminoethanol

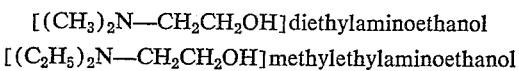 diethylpropylamine tripropylamine, dipropylethylamine etc. Particularly preferred catalysts are triethylamine and dimethylaminoethanol. The amine is generally used in amounts ranging from 0.5 to 10% by weight based on the alkylated phenol.

In accordance with a particularly preferred embodiment of the invention, a mixture of two tertiary amine catalysts is employed, both being within the boiling range indicated above, but one being somewhat more volatile and a somewhat stronger catalyst than the other. By use of such a combination of catalysts it has been found possible to obtain both a higher degree of formaldehyde consumption during the condensation reaction (thus promoting heat reactivity in the final resin) due to the stronger catalytic action of the more volatile amine and a sufficient degree of resinification during the stripping. When the condensation reaction is completed the more volatile amine is rapidly volatilized as the reaction mixture is heated up during the distillation step. At this point the less volatile, weaker amine catalyst becomes more strongly catalytic since it is retained in the reacticon mixture to a higher distillation temperature before being driven off and because of the higher temperature its catalytic activity is enhanced. The retention of the less volatile catalyst to a higher temperature upon distillation permits a certain amount of resinification to take place during the distillation, this being desirable to provide a resin of sufficiently high melting point that it does not soften or sinter at normal temperatures.

A particularly preferred pair of catalysts for carrying out the foregoing procedure is triethylamine as the stronger more volatile catalyst and dimethylaminoethanol as the somewhat weaker, less volatile catalyst. Triethylamine provides effective catalysis during the condensation reaction to promote good formaldehyde consumption, but this catalyst is removed in the early stages of the distillation (generally at a temperature of about 90° to 110° C.) and thus is not present to promote the desired resinification during distillation. To supply this need, a relatively small amount of dimethylaminoethanol is employed, preferably from 0.5 to 1.5% based on alkylated phenol insufficient to provide efficient catalysis during the condensation reaction. This small amount of catalyst, however, is retained in the reaction mixture as the distillation proceeds to a maximum temperature of about 140° C. At the higher temperature, it becomes a more effective catalyst and promotes the desired resinification to provide a resin of desirably high melting point.

In carrying out the invention, the alkylated phenol, the alcohol solvent and the tertiary-amine catalyst, together with the formaldehyde used in substantially anhydrous form, are combined and heated to the reflux temperature of the mixture with stirring and held at a moderate reflux for a sufficient length of time to effect the condensation of the alkylated phenol with the formaldehyde in an approximately equimolar ratio. Ordinarily, this requires a reaction period of from about 2 to 4 hours.

At this point the reactive phenol (preferably unsubstituted phenol) is introduced and the still homogeneous reaction mass is heated at reflux temperature until the first evidence of precipitation appears as evidenced by a striated, colloidal, or cloudy appearance of the reaction mass. Ordinarily, this second reaction period following the addition of the reactive phenol requires from about 3 to 8 hours. During the condensation at reflux, water is progressively evolved as a by-product of the condensation which progressively lowers the reflux temperature to the neighborhood of 95° to 100° C. at the end point.

Following the condensation reaction, stripping of the reaction mixture by distillation to remove the solvent and tertiary-amine catalyst is then carried out. Often it is preferred to begin the distillation at atmospheric pressure up to a still-pot temperature of about 120 to 140° C. and then to complete the distillation under a moderate vacuum of e.g. 80 to 120 mm. Hg. Initial distillation at atmospheric pressure is desirable since under these conditions the catalyst tends to be retained in the mixture to a higher still-pot temperature thus promoting the desired resinification during distillation. The maximum still-pot temperature reached at the end of the distillation should not be in excess of about 160° C. in order to avoid thermal degradation with accompanying darkening of the resin. Desirably, sufficient heat should be applied so that the atmospheric distillation does not take longer than about 105 minutes and the vacuum distillation longer than about 45 minutes. Otherwise gelation may occur.

The invention is illustrated by the following examples:

*Example 1*

A three-neck flask equipped with a reflux condenser, thermometer, and an agitator is charged with 164.2 grams (1.0 mole) of para-tertiary-amyl phenol, 65.9 grams (2.0 moles) of paraformaldehyde (flake form containing 91% formaldehyde), 60 grams of n-propanol, and 3.3 grams of triethylamine (2% by weight based on para-tertiary-amyl phenol) and 1.6 grams (1% by weight based on para-tertiary-amyl phenol) of dimethylaminoethanol. This mixture is heated with stirring to reflux temperature (approximately 116° C. initial mass temperature) and held at moderate reflux for 3 hours, the mass being homogeneous upon reaching reflux temperature and remaining so during the 3 hour reaction period. After the 3 hour reaction period during which the para-tertiary-amyl phenol condenses with approximately an equimolar amount of formaldehyde, 47 grams (0.5 mole) of unsubstituted phenol is introduced after which the reaction mass (still clear) is held at reflux for another 5 hours (during which the mass temperature drops gradually to approximately 100° C.) at the end of which period slight precipitation has occurred as evidenced by a slightly cloudy appearance of the reaction mass. At this point, approximately 85% of the initially charged formaldehyde has reacted.

The reaction mass is then distilled at atmospheric pressure while the mass temperature rises to 130° C. over a period of about 60–80 minutes. At this point a vacuum of approximately 100 mm. Hg is applied to the system to complete the stripping of the solvent and amine, the vacuum distillation being continued until the mass temperature rises to 145° C. over a period of 30 minutes. At this point heat and vacuum are cut and the stripped resin is dumped or poured into a cooling pan.

During the early stages of the atmospheric distillation, the triethylamine is stripped off while the less volatile dimethylaminoethanol is retained as the temperature rises to 130° C. at atmospheric pressure. The retention of the dimethylaminoethanol promotes resinification during this portion of the distillation. To avoid over resinification, vacuum is applied at this point and the dimethylaminoethanol is then quickly stripped out under a vacuum of 100 mm. Hg. At the end of the vacuum distillation the resin is essentially free of amine catalyst.

From the above reaction there is obtained 232 grams (86% yield based on starting phenol and anhydrous formaldehyde) of a heat reactive light to medium amber resin having a ball and ring melting point of 94° C. The resin is readily soluble in drying oils such as tung, linseed, dehydrated castor oil etc.

Example 2

A three neck flask equipped with a reflux condenser, thermometer and stirrer was charged with 164.2 grams (1.0 mole) of para-tertiary-amyl phenol, 65.9 grams (2.0 mole) of paraformaldehyde (flake from 91%), 3.3 grams of triethylamine (2% by weight based on para-tertiary-amyl phenol) and 1.6 grams of dimethylaminoethanol (1% by weight based on para-tertiary-amyl phenol), and 60 grams of tertiary-amyl alcohol. This mixture was heated at reflux temperature for 3 hours (100–112° C.) after which 47 grams (0.5 mole) of unsubstituted phenol was added after which the mixture is refluxed for an additional 4 hours at a temperature of 111° C. dropping to 101° C. at which point the mixture had become very slightly cloudy. At this point approximately 90% of the formaldehyde had reacted.

This reaction mixture was then distilled at atmospheric pressure, the temperature rising from 101° C. to 120° C. over a period of 55 minutes. Following this the mixture was distilled under a vacuum of 100 mm. Hg, the temperature rising from 120 to 130° C. over a period of about 20 minutes. The resin was then poured molten into cooling trays. From this reaction there is obtained 245 grams of resin (91% yield based on total phenol and formaldehyde) of a heat-reactive, oil-soluble light, yellow resin having a ball and ring melting point of 84° C.

Example 3

A three neck flask equipped with a reflux condenser and stirrer is charged with 164.2 grams (1.0 mole) of para-tertiary-amyl phenol, 49.5 grams (1.5 moles) of paraformaldehyde (flake form 91%), 16.6 grams (10% by weight based on para-tertiary-amyl phenol) of dimethylaminoethanol, and 63 grams of n-propanol. This mixture was heated at moderate reflux for 7½ hours, the reflux temperature dropping from 118° C. at the start to 101° C. at the end of this period as water of reaction was evolved. At the 7½ hour point, 14.1 grams (0.15 mole) of unsubstituted phenol was added, reflux regained, and the mixture held for 2½ hours at reflux at which point the reaction mixture was moderately cloudy.

The mixture was then distilled under an initial vacuum of 125 mm. Hg at an initial temperature of 80° C. The vacuum was increased to 100 mm. Hg and the distillation continued to a final mass temperature of 155° C. The resin was then poured hot into a cooling tray.

From this reaction there is obtained 220 grams of a heat-reactive, oil-soluble clear amber resin having a ball and ring melting point of 83° C.

Example 4

A three neck flask equipped with a reflux condenser and stirrer was charged with 164.2 grams (1.0 mole) of para-tertiary-amyl phenol, 59.3 grams (1.8 moles) of paraformaldehyde (91% flake form), 2.3 grams (2% based on para-tertiary-amyl phenol) of triethylamine, and 50 grams of n-propanol. This mixture was heated at reflux temperature (ranging from 120° C. at the start to 100° C. at the end) for 8 hours. After the first 3 hours 28.2 grams (0.3 mole) of phenol was added. At the end of the 8 hours reaction time the reaction mixture was slightly cloudy. Approximately 85% of the formaldehyde had reacted.

The reaction mixture was then distilled at atmospheric pressure at an initial temperature of 104° C. to a final temperature of 150° C. under a vacuum of 100 mm. Hg over a period of 99 minutes. There is obtained 225 grams (90% yield based on total phenol and paraformaldehyde) of a heat-reactive, oil-soluble light amber resin, slightly soft and tacky at room temperature.

Example 5

A varnish was prepared as follows using the resin prepared in accordance with Example 1.

300 grams of tung oil was heated to 300° F. after which 100 grams of the resin of Example 1 was added. The resin dissolved readily and foaming was noted (oil-resin reactivity) at 350°–400° F. as heating was continued to 480° F. The resin was held at 480° F. for 3 minutes at which time a light string is obtained. The bodying is then checked by the addition of 20 grams of bodied linseed oil after which the varnish is cooled to 400° F. and thinned with 425 grams of odorless mineral spirits. A varnish is obtained having a Gardner color rating of 5–6 and a Gardner viscosity rating of M–N.

After the addition of cobalt naphthenate (0.03% cobalt) and lead naphthenate (0.5% lead based on oil content) as driers, varnish coatings were prepared which dried to tack free condition in 5 to 6 hours and to finger nail hardness in 30 hours to a coating having a final light yellow color. After drying 4 days at room temperature, the coatings were tested for chemical resistance and shown to have good to excellent resistance to distilled water, aqueous caustic, and odorless mineral spirits.

Varnishes of similar properties were prepared in a generally similar manner from the resins of Examples 2, 3 and 4.

We claim:
1. A method for preparing a heat-reactive, oil-soluble phenolic resin comprising the steps of reacting an alkylated phenol of the formula:

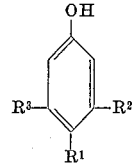

where $R^1$ is an alkyl group having from 4 to 9 carbon atoms and $R^2$ and $R^3$ are selected from the class consisting of hydrogen and methyl radicals with formaldehyde in an initially substantially anhydrous liquid reaction medium in the presence of an aliphatic tertiary monoamine catalyst having a boiling temperature of from 80° C. to 200° C.

and as a solvent for the reaction mixture an alcohol having a boiling temperature in the range of from 80° C. to 120° C. in an amount sufficient to maintain the reaction mixture in a substantially one phase solution during the reaction, heating said mixture at the reflux temperature thereof to condense said alkylated phenol and formaldehyde, adding a phenol having the same order of reactivity with formaldehyde as unsubstituted phenol to said mixture in a minor amount, ranging from 0.1 to 0.6 mole per mole of said alkylated phenol, insufficient to substantially effect the oil solubility of the finished resin, heating said second mixture at the reflux temperature thereof until slight precipitation of said resin occurs, and then distilling said mixture to a maximum still-pot temperature of 160° C. to drive off said amine catalyst and said alcohol solvent, the molar ratio of formaldehyde to total phenol employed in said reaction being in the range of about 1.1:1 to 2:1.

2. A method for preparing a heat-reactive, oil-soluble phenolic resin comprising the steps of reacting an alkylated phenol of the formula

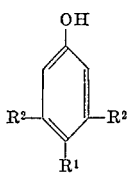

where $R^1$ is an alkyl group having from 4 to 9 carbon atoms and $R^2$ and $R^3$ are selected from the class consisting of hydrogen and methyl radicals with formaldehyde in an initially substantially anhydrous liquid reaction medium in the presence of an aliphatic tertiary monoamine catalyst having a boiling temperature of from 80° to 200° C. and an aliphatic alcohol having from 3 to 5 carbon atoms and having a boiling temperature in the range of from 80° C. to 120° C. in an amount sufficient to maintain the reaction mixture in a substantially one phase solution during the reaction, heating said mixture at the reflux temperature thereof for sufficient time to condense said alkylated alcohol and formaldehyde in an approximately equimolar ratio, adding a phenol having the same order of reactivity with formaldehyde as unsubstituted phenol to said mixture in an amount ranging from 0.1 to 0.6 mole per mole of said alkylated phenol, heating said second mixture at the reflux temperature thereof until slight precipitation of said resin occurs, and then distilling said mixture to a maximum still-pot temperature of 160° C. to drive off said amine catalyst and said alcohol solvent, the molar ratio of formaldehyde to total phenol employed in said reaction being in the range of about 1.1:1 to 2:1.

3. A method for preparing a heat-reactive, oil-soluble phenolic resin comprising the steps of reacting a para-alkylated phenol having an alkyl group of from 4 to 9 carbon atoms with formaldehyde in an initially substantially anhydrous reaction medium in the presence of an aliphatic tertiary monoamine catalyst having a boiling temperature of from 85° C. to 200° C. and an aliphatic alcohol having from 3 to 5 carbon atoms and having a boiling temperature in the range of from 80° C. to 120° C. in an amount sufficient to maintain the reaction mixture in a substantially one phase solution during the reaction, heating said mixture at the reflux temperature thereof for sufficient time to condense said alkylated phenol and said formaldehyde in an approximately equimolar ratio, adding a phenol having the same order of reactivity with formaldehyde as unsubstituted phenol to said mixture in an amount ranging from 0.1 to 0.6 mol per mol of said alkylated phenol, heating said second mixture at the reflux temperature thereof until slight precipitation of said resin occurs, and then distilling said mixture to a maximum still-pot temperature of 160° C., the molar ratio of formaldehyde to total phenol employed in said reaction being in the range of about 1.1:1 to 2:1.

4. A method in accordance with claim 3 in which said alkylated phenol is para-tertiary-amyl phenol.

5. A method in accordance with claim 3 in which said catalyst is selected from the class consisting of triethylamine, dimethylaminoethanol and mixtures thereof.

6. A method in accordance with claim 3 in which said alcohol is selected from the class consisting of n-propanol, tertiary-butyl alcohol and tertiary-amyl alcohol.

7. A method in accordance with claim 3 in which said reactive phenol is unsubstituted phenol.

8. A method for preparing a heat-reactive, oil-soluble phenolic resin comprising the steps of reacting para-tertiary-amyl phenol with formaldehyde in an initially substantially anhydrous liquid reaction medium in the presence of a tertiary-amine catalyst selected from the class consisting of triethylamine, dimethylaminoethanol and mixtures thereof, and in the presence of an aliphatic alcohol having from 3 to 5 carbon atoms inclusive and a boiling temperature in the range of from 80° to 120° C. in an amount sufficient to maintain the reaction mixture in a substantially one phase solution during the reaction, heating said mixture at the reflux temperature thereof for sufficient time to condense said para-tertiary-amyl phenol and said formaldehyde in an approximately equimolar ratio, adding unsubstituted phenol to said mixture in an amount ranging from 0.3 to 0.5 moles per mole of said paratertiary-amyl phenol, heating said second mixture at the reflux temperature thereof until slight precipitation of said resin occurs, and then distilling said mixture to a maximum still-pot temperature of 160° C. to drive off said amine catalyst and said alcohol solvent, the molar ratio of formaldehyde to total phenol employed in said reaction being in the range of about 1.1:1 to 2:1.

9. A method in accordance with claim 8 in which the said alcohol is selected from the class consisting of n-propanol, tertiary-butyl-alcohol and tertiary-amyl-alcohol.

10. A method for preparing a heat-reactive, oil-soluble phenolic resin comprising the steps of reacting an alkylated phenol of the formula:

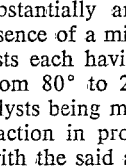

where $R^1$ is an alkyl group having from 4 to 9 carbon atoms and $R^2$ and $R^3$ are selected from the class consisting of hydrogen and methyl radicals with formaldehyde in an initially substantially anhydrous liquid reaction medium in the presence of a mixture of aliphatic tertiary monoamine catalysts each having a boiling temperature of the range of from 80° to 200° C., the first of said tertiary-amine catalysts being more volatile and having a stronger catalytic action in promoting the condensation of formaldehyde with the said alkylated phenol than the second of said amines, said reaction being conducted in the presence of an alcohol having a boiling temperature in the range of from 80° C. to 120° C. in an amount sufficient to maintain the reaction mixture in a substantially one phase solution during the reaction, heating said mixture at the reflux temperature thereof for sufficient time to condense said alkylated phenol and formaldehyde in an approximately equimolar ratio, adding a phenol having the same order of reactivity with formaldehyde as unsubstituted phenol to said mixture in a minor amount, ranging from 0.1 to 0.6 mole per mole of said alkylated phenol, insufficient to substantially effect the oil solubility of the resin produced, heating said second mixture at the reflux temperature thereof until slight precipitation of resin occurs, distilling said mixture at a temperature and pressure at which said first, more volatile amine is rapidly stripped from the reaction mixture but at which said second less volatile amine is retained therein and continuing the distillation at a temperature above that at which said condensation reaction is carried out to promote partial resinification of said resin in the presence of said less volatile catalyst, continuing said distillation under reduced presssure to strip off said less volatile catalyst and to complete the stripping of said alcohol solvent, the molar ratio of formaldehyde to total phenol employed in said reaction being in the range of about 1.1:1 to 2:1.

11. A method for preparing a heat-reactive, oil-soluble phenolic resin comprising the steps of reacting an alkylated phenol in which said alkyl group contains from 4 to 5 carbon atoms with formaldehyde in an initially substantially anhydrous liquid reaction medium in the presence of a mixture of triethylamine and dimethylaminoethanol as condensation catalysts, said reaction being carried out in the presence of an aliphatic alcohol having from 3 to 5 carbon atoms and having a boiling temperature in the range from 80° to 120° C. in an amount sufficient to maintain the reaction mixture in a substantially one phase solution during the reaction, heating said mixture at the reflux temperature thereof for sufficient time to condense said alkylated phenol having the same order of reactivity with formaldehyde as unsubstituted phenol and said formaldehyde in an approximately equimolar ratio, adding a phenol to said mixture in a minor amount, ranging from 0.1 to 0.6 mole per mole of said alkylated phenol, insufficient to substantially effect the oil solubility of the final resin, heating said second mixture at the reflux temperature thereof until slight precipitation of the resin occurs, and then distilling said mixture under conditions for rapidly stripping off said triethylamine but under which said dimethylaminoethanol remains in said mixture, and continuing the distillation under said conditions to promote partial resinification of said resin, and then continuing the distillation under reduced pressure to strip off said dimethylaminoethanol and remainder of said alcohol solvent, the molar ratio of formaldehyde to total phenol in said reaction being in the range of about 1.1:1 to 2:1.

12. A method in accordance with claim 11 in which said alcohol is selected from the class consisting of n-propanol, tertiary-butyl alcohol and tertiary-amyl alcohol.

13. A method in accordance with claim 12 in which said reactive phenol is unsubstituted phenol and is employed in said mixture in an amount ranging from 0.1 to 0.6 mole per mole of said alkylated phenol.

References Cited in the file of this patent

UNITED STATES PATENTS

| | | |
|---|---|---|
| 2,058,797 | Honel | Oct. 27, 1936 |
| 2,151,975 | Kline | Mar. 28, 1939 |
| 2,675,335 | Rankin et al. | Apr. 13, 1954 |

UNITED STATES PATENT OFFICE
CERTIFICATE OF CORRECTION

Patent No. 3,053,807            September 11, 1962

Burton E. Lederman et al.

It is hereby certified that error appears in the above numbered patent requiring correction and that the said Letters Patent should read as corrected below.

Column 2, line 48, for "silght" read -- slight --; line 64, for "recation" read -- reaction --; column 3, line 66, for "reacticon" read -- reaction --; column 5, line 40, for "from" read -- form --; column 7, lines 21 to 27, the formula should appear as shown below instead of as in the patent:

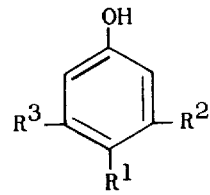

column 9, lines 26 and 27, strike out "and said formaldehyde in an approximately equimolar ratio, adding a phenol" and insert the same after "phenol" in line 24, same column 9; column 10, line 12, after "phenol" insert -- employed --.

Signed and sealed this 22nd day of January 1963.

(SEAL)
Attest:

ERNEST W. SWIDER

Attesting Officer

DAVID L. LADD

Commissioner of Patents